United States Patent
Abdel-Fattah et al.

(10) Patent No.: US 8,795,758 B2
(45) Date of Patent: Aug. 5, 2014

(54) DRIED VEGETABLES AND A PROCESS FOR PRODUCING THE SAME

(75) Inventors: El-Sayed Abdel-Fattah, Zagazig Sharkia (EG); Rudi Günter Mueller, Heilbronn (DE); Vicki Clarissa Dey-Weisbecker, Heilbronn (DE)

(73) Assignee: Conopco, Inc., Englewood Cliffs, NJ (US)

( * ) Notice: Subject to any disclaimer, the term of this patent is extended or adjusted under 35 U.S.C. 154(b) by 257 days.

(21) Appl. No.: 13/056,381

(22) PCT Filed: Jul. 13, 2009
(Under 37 CFR 1.47)

(86) PCT No.: PCT/EP2009/058899
§ 371 (c)(1),
(2), (4) Date: Jul. 18, 2011

(87) PCT Pub. No.: WO2010/012580
PCT Pub. Date: Feb. 4, 2010

(65) Prior Publication Data
US 2012/0148708 A1 Jun. 14, 2012

(30) Foreign Application Priority Data
Aug. 1, 2008 (EP) .................................. 08161610

(51) Int. Cl.
*A23L 1/212* (2006.01)

(52) U.S. Cl.
USPC ............. 426/615; 426/74; 426/384; 426/456; 426/464; 426/520; 426/640

(58) Field of Classification Search
USPC ............ 426/615, 74, 640, 384, 456, 464, 520
See application file for complete search history.

(56) References Cited

U.S. PATENT DOCUMENTS

| 4,361,589 A | 11/1982 | Wauters et al. |
| 4,832,969 A | 5/1989 | Lioutas |
| 5,227,183 A | 7/1993 | Aung et al. |
| 2004/0166228 A1 | 8/2004 | Loh et al. |

FOREIGN PATENT DOCUMENTS

| EP | 1 442 662 A | 8/2004 |
| GB | 2 114 865 A | 9/1983 |

OTHER PUBLICATIONS

EP Search Report, EP 08 16 1610, Feb. 17, 2009, 2 pp.
Souci, "Food composition and nutrition tables", Jan. 1, 1989, p. 697, XP002515555.
Jayaraman, et al., "Effect of pretreatment with salt and sucrose on the quality and stability of dehydrated cauliflower", International Journal of Food Science and Technology (1990), 25, pp. 47-60.

*Primary Examiner* — Helen F Heggestad
(74) *Attorney, Agent, or Firm* — Ellen Plotkin

(57) ABSTRACT

The present invention relates to a process to prepare a dried vegetable product comprising the steps of —subjecting a vegetable to a hypertonic heat shock by contacting (preferably submerging) the vegetable with (in) a hypertonic heat shock solution comprising at least one edible salt, at a temperature of 101 to 112 degrees C.; —coating the hypertonically heat shocked vegetable with a coating mix and —drying the coated hypertonically heat shocked vegetable.

9 Claims, No Drawings

DRIED VEGETABLES AND A PROCESS FOR PRODUCING THE SAME

The present invention relates to the field of dried food products, in particular dried vegetables like broccoli and a process for producing the same.

The green broccoli florets form a visually attractive ingredient because of the distinctive form and green colour. Fresh broccoli is unsurpassed in flavour, colour and "bite". In addition, broccoli is rather nutritious in terms of the high level of antioxidants and vitamins. However, the limited shelf stability of fresh broccoli creates a need for other forms. Frozen broccoli is a well known alternative although it is rather expensive and depends on the availability of freezing cabinets. In contrast, dried broccoli provides an ambient stable alternative and processes to dry broccoli are known. For example, dried soups and dried meals which typically need to be prepared with hot water may contain pieces of dried broccoli. However, broccoli dried by known processes typically has lost the "bite" of blanched fresh broccoli.

BACKGROUND OF THE INVENTION

One could simply dry e.g. fresh broccoli by lyophilisation without prior heat treatment to obtain a dried broccoli. Such dried broccoli has an unacceptable short life because it would still contain relatively high levels of enzymes. Such products are unsuitable for use in food industry as mass produced food products need to have a long shelf life. The prior art discloses various examples of dried broccoli. High amounts of salt, sugar, glycerol, sorbitol, however, severely limit the application as the dried product inherently tastes very sweet or very salty and has lost the "bite". Relatively high amounts of water are undesirable as the water may migrate to other components in the dried food product and cause it stick together like in dried soups.

One example of a very sweet dried vegetable and a process for producing the same is disclosed in U.S. Pat. No. 4,832,969. In example 7 thereof, a process is disclosed for producing dried broccoli florets comprising heating the florets in distilled water containing 0.06 wt % of MgCO3 at 212 degrees F. (=100 degrees C.) for 70 seconds. The vegetable solids content of a dehydrated material prepared according to description is only 28 wt % for broccoli florets. The dried vegetable product comprises typically more than 40% of glycerol and sugar resulting in a very sweet product with limited application. In fact, the product is so sweet it is recommended to add a bittering agent like potassium chloride to moderate the sweet taste.

GB-2 114 865 discloses a process to prepare dried vegetables. However, all examples show that the resultant dried vegetable contains more than 50 wt % of additives such as NaCl, monosodium glutamate (MSG), proteins or sugars and thus relatively low amounts of vegetable solids. The resultant products have a limited application due to the high levels of additives and sweet/salty/umami taste. Moreover the dried vegetables prepared according GB-2 114 865 are chewy and do not have a good "bite".

F. S. Jayaraman et al. (International Journal of Food Science and Technology (1990) 25, 47-60) discloses a process for drying cauliflower whereby cauliflower is incubated in a solution comprising 3 wt % NaCl and 6 wt % of sucrose for 12-16 hrs at 0-4 C. Jayaraman et al explicitly teaches that more than 3 wt % of NaCl does not provide added benefits. However, this process results in a dried vegetable with a sugar content of 39 wt %, NaCl content of 16 wt % and less than 40 wt % vegetable solids. Again the high levels of salt and sugar limit the application of such products. Perhaps more importantly, the long soak causes important nutrients like vitamin C to leach out of the vegetable: only 14% of the vitamin C remained in the dried vegetable. The bite is not good but chewy.

It is an object of the invention to provide a process to prepare a dried vegetable product with the following features: a high content of vegetable solids, substantially free from polyols such as sorbitol or glycerol, having a good bite after re-hydration (not chewy), a relatively neutral taste such that it can be used in a wide variety of dry applications, a low water activity while maintaining good re-hydrating properties and good light stability, suitable to be packaged with other dried ingredients without undesirable migration of water from the dried vegetable products, and a high retention of vitamin C. Another object of the invention is to provide a dried vegetable product for use in mass produced food products with long shelf life.

SUMMARY OF THE INVENTION

According a first embodiment of the invention a process for preparing a dried vegetable product is provided comprising the steps of
  a) optionally washing and peeling of a vegetable;
  b) optionally, comminuting a vegetable;
  c) subjecting a vegetable to a hypertonic heat shock by contacting (preferably submerging) the vegetable with (in) a hypertonic heat shock solution comprising at least one edible salt, at a temperature of 101 to 112 degrees C., preferably of 102 to 111 degrees C., preferably for 1 to 300 seconds, more preferably for 2 to 250 seconds, most preferably for 3 seconds to 225 seconds, said heat shock solution optionally further comprising
    0 to 10 wt % of sucrose by weight of the hypertonic heat shock solution
    0 to 1 wt % of a polyol selected from sorbitol, glycerol and mixtures thereof;
  d) coating the hypertonically heat shocked vegetable with a coating mix and
  e) drying the coated hypertonically heat shocked vegetable.

According to a second embodiment of the invention a dried vegetable product is provided comprising
  from 50 to 95 wt %, preferably from 55 to 92 wt %, more preferably from 60 to 90 wt % of vegetable solids;
  Aw from 0.1 to 0.45, preferably from 0.15 to 0.40, more preferably from 0.2 to 0.35;
  from 0.5 to 30 wt %, preferably from 2 to 27 wt %, more preferably from 4 to 25 wt % of NaCl; and
  from 0.1 to 25 wt %, preferably from 0.5 to 20 wt %, more preferably from 2 to 15 wt % of at least one film forming compound.

Although not wishing to be bound by theory applicants believe that subjecting the vegetables to unusually high temperatures in a hypertonic aqueous environment for a short period of time followed by a coating step, combined with the other steps in the process surprisingly caused a controlled and moderate destruction at cellular level resulting in a dried vegetable product with excellent bite without the need for high amounts of additives like sucrose, MSG, NaCl, polyols. This was rather unexpected as the hypertonic heat shock solution has a surprisingly extreme temperature of at least 101 degrees C. The heat shock process is substantially free from saccharides to avoid an unnatural sweet taste. The process is believed to inactivate enzymes resulting in an improved shelf life needed for mass produced food products.

DETAILED DESCRIPTION OF THE INVENTION

The term "vegetable" is meant to describe any edible plant or edible part thereof as used in the culinary sense: a vegetable can be used as the main part of a dish. It does not include herbs: aromatic green plants which are not used as the main part of a dish but typically used in small amounts to flavour dishes such as chives, basil, oregano, thyme, lovage, parsley, dill, rosemary, celery leaves, chervil, coriander (cilantro) leaves, marjoram, tarragon, mint, lemon leaves, lemon grass, Thai basil. In contrast to broccoli where the bite is perhaps as important as its flavour, herbs are without exception used for their flavour. Herbs are usually used after cutting it such small pieces the bite thereof is irrelevant. Preservation of the flavour after drying is important for herbs and not the "bite". Some aromatic roots like ginger and laos are culinary used as herbs in small amounts and are not included in the term "vegetable". Vegetable obviously does not include grains and pulses.

The term "vegetable" preferably includes: broccoli, green beans, garden pea, green asparagus, spinach, zucchini (courgette), green onion, rucola, water crest, pak choy, green cabbage, lettuce, wine leaves, green bell pepper, green chili pepper, potato, sweet corn, mushroom, bean sprout, cauliflower, non-green cabbage, onion, white asparagus, bamboo shoots, leek, radish, celery roots, parsley roots, carrots, yellow zucchini, non-green bell pepper, non-green chili pepper and mixtures thereof.

Vegetables as used in this application do not include spices which usually are dried seeds or fruits with a very strong aroma like cumin, coriander seeds, black pepper corns, white pepper corns, mustard seeds. This is for the same reason as mentioned above for herbs: for spices preservation of the "bite" plays an insignificant role compared to the taste. Perhaps more importantly, spices are traditionally used because of the flavour present in the dried form rather than in the fresh form.

Different embodiments of the invention may be carried out in using preferred or more preferred conditions (e.g. temperature, time) or amounts of ingredients (e.g. NaCl, film forming compound). Preferred ranges will often be described in the following format: from x1 to y1, preferably from x2 to y2, more preferably from x3 to y3, whereby $x1<x2<x3<y3<y2<y1$. This format is intended to include the endpoints and also all sub-ranges subsumed therein (e.g. from x1 to y3 and from x3 to y1). This format is also intended to include the open ended ranges: preferably at least x1, more preferably at least x2, even more preferably at least x3, preferably at most y1, more preferably at most y2, even more preferably at most y3.

Some features may be described as optional. This means that said feature may or may not be included in the process or composition. For example, the hypertonic heat shock solution optionally comprises 0 to 10 wt % sucrose. This means that the hypertonic heat shock solution may or may not contain sucrose. However, if sucrose is present it will be present in the given range, in this example an amount of 0 to 10 wt % whereby 0 wt % is intended to mean that 0 wt % is present i.e. no sucrose. Such a range including 0 wt % is often used for ingredients which are preferred to be present in small amounts or not at all.

Other than in the examples, or where otherwise indicated, all percentages are weight/weight percentages. Where the term "comprising" is used in the specification or claims, it is not intended to exclude any terms, steps or features not specifically recited.

Although the description below often refers to a vegetable it will be clear to the skilled person that it possible to use one vegetable or a mixture of vegetables.

According to an optional step in an embodiment of the process, the fresh vegetable may be washed and peeled if desired. The starting material is preferably fresh although in some case frozen vegetables may be used. The vegetable typically has size which is large enough so when eaten it will be chewed to experience the bite thereof, such like the size of garden peas. Larger vegetables will usually need to be comminuted into bite size chunks that can be easily processed on an industrial filling line. For example broccoli and cauliflower may be cut into florets whereby the largest dimension measured along any one of the axis' can be 15 to 20 mm. Green beans, asparagus and other similar sized vegetable can be cut across into pieces of about 15-20 mm. Bean sprouts and spinach are so thin these may or may not be cut. If uncut the largest dimension measured along any one of the axis' may be 40-80 mm, i.e. the full length of a bean sprout respectively spinach leave. Thick leave like vegetables like cabbage will usually need to be cut whereby the largest dimension measured along any one of the axis' can be 15 to 20 mm. Thus desired size will depend on the application and the type of vegetable but the largest dimension along any one of the axis' of the vegetable before the heat shock will preferably be at least 5 mm, more preferably at least 10 mm, even more preferably at least 15 mm, preferably at most 100 mm, more preferably at most 30 mm. The smallest dimension measured along any one of the axis' will also depend on the type of vegetable. The smallest dimension influences the efficiency of the hypertonic heat shock. For vegetables like spinach it will be the thickness of the leave itself. For cauliflower and broccoli florets it will be thickness of the branches or buds respectively.

However, for vegetables like carrots, zucchini's, pumpkin it will largely depend on the way it is cut. In those cases the smallest dimension may be at most 20 mm, preferably at most 15 mm. For broccoli also sliced stems of similar dimension can be used. The volume of the vegetable before the heat shock will preferably be from 9 mm3 to 27 cm3, more preferably from 20 mm3 to 27 cm3.

After the optional steps of washing/peeling, comminuting it is essential to subject the vegetable to a hypertonic heat shock by contacting the vegetable with (in) a hypertonic heat shock solution, (preferably submerging the vegetable in the hypertonic heat shock solution).

The process to prepare the dried vegetable product and dried vegetable product itself is preferably substantially free from polyols like sorbitol and glycerol. Although not wishing to be bound by theory applicants believe that polyols when added to the dried vegetable product for example in the hypertonic heat shock solution or coating mix decrease the "bite" of the dried vegetable product. The term "substantially free from polyols" is intended to describe a hypertonic heat shock solution, a coating mix or dried vegetable product comprising optionally 0 to 3 wt % of polyols like sorbitol and glycerol and mixtures thereof. Preferably the hypertonic heat shock solution, a coating mix or dried vegetable product comprise at most 3 wt %, more preferably at most 0.1 wt %, most preferably 0 wt % of polyol and preferably least 0.01 wt %, more preferably at least 0.05 wt %, most preferably at least 0.1 wt %, by weight of the hypertonic heat shock solution, coating mix or dried vegetable product respectively.

The hypertonic heat shock solution is an aqueous solution and comprises an effective amount of at least one osmotic agent like an edible salt to be hypertonic. For better results, the hypertonic heat shock solution preferably has a certain osmolality. The hypertonic heat shock solution preferably has an osmolality of from 1000 to 12400 mOsmol/kg, preferably from 1250 to 10000 mOsmol/kg, more preferably from 1500 to 8500 mOsmol/kg. According to a preferred embodiment, the hypertonic heat solution comprises 5 to 35 wt %, preferably from 10 to 33 wt %, more preferably from 15 to 30 wt % of at least one edible salt by weight of the hypertonic heat shock solution. The at least one edible salt is preferably a chloride salt, usually NaCl. Mixtures of other edible salts may be used e.g. mixtures two or more of the following salts may be used NaCl, KCl, Mg-salts, Calcium salts.

To obtain the advantages, applicants found that it was important to subject the vegetables to unusually high temperatures in a hypertonic aqueous environment for a short period of time. The hypertonic heat shock solution has a temperature of from 101 to 112 degrees C., preferably of from 102 to 111 degrees C., more preferably of from 105 to 111 degrees C. preferably at atmospheric pressure. It was possible to force such high temperatures in an aqueous environment at atmospheric pressure by using sufficient amounts of the salt or mixture of salts as described above. Thus, according this embodiment it is preferred that the hypertonic heat shock solution comprises a sufficient amount of at least one edible salt to increase the boiling temperature at atmospheric pressure to 101 to 112 degrees C., preferably 102 to 111 degrees C.

Preferably, the vegetable is contacted with the hypertonic heat shock solution for preferably for 1 to 300 seconds, more preferably for 2 to 250 seconds, most preferably for 3 seconds to 225 seconds.

Typical times are for spinach 5 seconds, broccoli florets between 50 and 120 seconds and for carrot pieces between 30 and 300 seconds.

In most cases the hypertonic heat shock solution will be substantially free from saccharides selected from the group sucrose, fructose, glucose, maltose, honey, maltitol, hydrogenated corn syrup, high fructose corn syrup and mixtures thereof, to avoid unnatural sweet tasting products. Substantially free from saccharides means that only a minor amount saccharide is present in the hypertonic heat shock solution e.g. at most 10 wt %, preferably at most 5 wt % or most desirably 0 wt % saccharide is present. Optionally 0 to 10 wt % or 0 to 5 wt % saccharide is present in the hypertonic heat shock solution. (all weights by weight of the hypertonic heat shock solution).

The hypertonic heat shock solution will often be substantially free from monosodium glutamate. Substantially free from monosodium glutamate means that only a minor amount monosodium glutamate is present in the hypertonic heat shock solution e.g. at most 10 wt %, preferably at most 5 wt % or most desirably 0 wt % monosodium glutamate is present. Optionally 0 to 10 wt % or 0 to 5 wt % of monosodium glutamate is present in the hypertonic heat shock solution. (all weights by weight of the hypertonic heat shock solution). The hypertonic heat shock solution preferably contains 0 to 300 ppm of zinc.

Although the amount of hypertonic heat shock solution to be used in the process can be varied greatly, it is advantageous to use certain w/w ratio between the amount of vegetable to be heat shocked and the amount of hypertonic heat shock solution to obtain an optimal hypertonic heat shock. Preferably the ratio (w/w) of vegetable to hypertonic heat shock solution ranges from 1:01 to 1:100 preferably from 1:0.5 to 1:20, more preferably from 1:1 to 1:10.

After the heat shock the hypertonically heat shocked vegetable may optionally be rinsed with water to remove excess salt depending on the level of salt in the hypertonic heat shock solution and the desired application.

The hypertonically heat shocked vegetable may also be cooled. Preferably, the temperature of the hypertonically heat shocked vegetable after the heat shock but before the coating is cooled to a temperature of at least 20 degrees C., preferably at least 30 degrees C., more preferably at least 50 degrees C., preferably at most 80, preferably at most 70, more preferably at most 60 degrees C. Alternatively, the temperature of the hypertonically heat shocked vegetable after the heat shock is cooled to these temperatures during the coating step described below by using a coating mix having a temperature of from 20 to 80 degrees C., preferably from 30 to 70 degrees C., more preferably from 50 to 60 degrees C.

In an essential step after the heat shock, the hypertonically heat shocked vegetable is coated with a coating mix. The relative amount of coating mix can be chosen by the skilled person in the art. Better results may be obtained when the ratio (w/w) of hypertonically heat shocked vegetable to coating mix ranges from 1:0.1 to 1:100, preferably from 1:0.2 to 1:20, more preferably from 1:0.5 to 1:10.

The coating mix comprises of
at least one film forming compound is an amount sufficient to form a film after drying the vegetable, preferably selected from starch, a dextrin, trehalose, soluble fibers, gums, agar agar, gelatine and mixtures thereof;
from 0.1 to 25 wt %, preferably from 0.3 to 10 wt %, more preferably from 0.5 to 5 wt %, of an edible salt composition; and
preferably from 0.1 to 15 wt %, preferably from 0.3 to 10 wt %, more preferably from 0.5 to 3.5 wt % of a sweetening agent, all wt % by weight of the total coating mix.

The coating mix comprises an effective amount of film forming compound. An effective amount is an amount sufficient to form a film after drying the vegetable. The exact amounts may depend on the type of film forming compound but general the coating mix comprises from 0.05 to 33 wt %, preferably from 0.3 to 15 wt %, more preferably from 0.2 to 13 wt %, and of at least one film forming compound by weight of the total coating mix. The film forming compound is preferably selected from starch, a dextrin, trehalose, soluble fibers, gums (e.g. Arabic gum, guar) agar agar, gelatine, or mixtures thereof. It is noted that mono- and disaccharides like glucose and sucrose are not film forming compounds for purpose of the present application but sweetening agents. Trehalose is considered a film forming compound for the present purpose and not a sweetening agent. The coating mix may further comprise from 0.1 to 15 wt %, preferably from 0.3 to 10 wt %, more preferably from 0.5 to 3.5 wt % of a sweetening agent, all wt % by weight of the total coating mix.

Typical amounts of film forming compounds include for gelatine (2-5 g/L), starch (10 g/L, possibly combined with 30-60 g/L trehalose), gums (1-3 g/L); trehalose (may be combined with a starch), fibres (10-50 g/L), maltodextrin (50-200 g/L). Maltodextrin can have a Dextrose Equivalent of from 3 to 50, preferably from 5 to 30, more preferably from 10 to 25. Mixtures of film forming compounds can also be used successfully such a mixture of starch and maltodextrin and optionally trehalose, sucrose (30-50 g/L) and/or a fibre. Suitable forms of soluble fibre include soluble corn fibre, soluble apple fibre.

Any starch may be used. Starch in the coating mix can be gelatinised. Preferably a pre-gelatinised starch is used. Wheat flour may also be used as a source of starch. Suitable starch sources include flour from tapioca, rice, corn, potato starch and mixtures thereof.

According to one preferred embodiment the coating mix comprises a mixture of at least one maltodextrin and at least one starch, preferably

- from 0.5 to 25 wt %, preferably from 1 to 20 wt %, more preferably from 3 to 10 wt %, of a maltodextrin and
- from 0.05 to 8 wt %, preferably from 0.1 to 5 wt %, more preferably from 0.2 to 3 wt % of a starch, preferably a native cold swelling starch, all wt % by weight of the total coating mix.

Coating mix is preferably an aqueous solution like water. In some case it may be desired to include an the edible salt composition in the coating mix, said edible salt composition comprising

- from 1 to 100 wt %, preferably from 5 to 80 wt %, more preferably from 10 to 70 wt % of NaCl;
- preferably from 1 to 90 wt %, preferably from 5 to 80 wt %, more preferably from 10 to 70 wt % of at least one potassium salt, preferably in the form of KCl
- optionally from 0.2 to 40 wt %, preferably from 0.5 to 30 wt %, more preferably from 1 to 20 wt % of at least one Mg salt, all wt % by weight of the edible salt composition.

The Mg salt is preferably selected from MgCl2 salt, Carnalite (KMgCl3×6 H2O), Epsomite (Mg (SO4)×7 H2O), Picromerite K2Mg (SO4)2 and mixtures thereof. The edible chloride salt composition comprises preferably NaCl, KCl, MgCl2, CaCl2 or a mixture thereof. Low sodium sea salt or algae may also be a source of Mg salt. Algea e.g. spirulina can also be used in the coating mix as a source of Mg and fibres.

The sweetening agent may be sucrose, glucose, fructose, any another compound used for sweetening food products and mixtures thereof.

The coating mix will often be substantially free from monosodium glutamate. Substantially free from monosodium glutamate means that only a minor amount monosodium glutamate is present in coating mix e.g. at most 10 wt %, preferably at most 5 wt % or most desirably 0 wt % monosodium glutamate is present. Optionally 0 to 10 wt % or 0 to 5 wt % of monosodium glutamate is present in the coating mix. (all weights by weight of the coating mix)

The coating step should preferably be carried out at a certain temperature for better results. Preferably for the coating step the hyper tonic heat shocked vegetable is contacted with the coating mix for 1 to 30 minutes, preferably 2 to 25 minutes, more preferably 3 to 20 minutes; and

- the coating mix has a temperature of from 20 to 80 degrees C., preferably from 30 to 70 degrees C., more preferably from 50 to 60 degrees C.

The pH of the coating mix or the hypertonic heat shock solution may be adjusted to the type of vegetable. For green vegetables the coating mix pH of 6.5 to 8, preferably a pH of 7 to 7.8. Green vegetables include broccoli (florets, sliced stems), green beans, garden pea, green asparagus, spinach, zucchini, green onion, rucola, water crest, pak choy, green cabbage, lettuce, wine leaves, green bell pepper, green chili pepper and mixtures thereof.

The pH of the coating mix or the coating mix may be lower in case of non-green vegetables. For example for potato, sweet corn, mushroom, bean sprout, cauliflower, non-green cabbage, onion, white asparagus, bamboo shoots, leek, radish, celery roots, parsley roots and mixtures thereof, the pH of the coating mix may be at least 5 and preferably at most 6.5.

In the case of carrot (yellow, red, purple), pumpkin, beetroot, white, red cabbage, cauliflower, celery roots, parsley roots, mushroom, yellow zucchini, non-green bell pepper, non-green chili pepper and mixtures thereof, the pH of the coating mix or hypertonic heat shock solution may be even lower, at least 3.5 and preferably at most 5.

The desired pH may be obtained by using any food grade acid or base like citric acid, a fruit juice, a fruit juice concentrate, vitamine C, lactic acid, KCl, Mg salts such MgCl2, MgSO4, Carnalite or Epsomite.

After coating the vegetable, the coated hypertonically heat shocked vegetable is dried. Any conventional drying method may be used including (hot) air, freeze drying, microwave drying, sun drying. It may be dried until a water activity (Aw) is achieved of from 0.1 to 0.45, preferably from 0.15 to 0.40, more preferably from 0.2 to 0.35.

Prior to the drying step the coated hypertonically heat shocked vegetable may be frozen to form a frozen coated hypertonically heat shocked vegetable. The advantage of the intermediate freezing step is that the frozen product may then be shipped to another location for the drying step. This results in a more flexible supply chain as it allows to hypertonically heat shock the vegetable close to where it is harvested without the need to build drying facilities there. In addition, it allows for a higher quality vegetable product as the vegetable can be processed short after harvest without the need to transport it first. Furthermore, the hypertonically heat-shocked vegetable will typically have a much smaller volume than the fresh vegetable thereby reducing the transportation costs significantly.

The dried vegetable product obtainable from this process has a remarkable fresh "bite" in contrast to dried vegetables using processes known in the art. The dried vegetable product obtainable from this process is also free from other drawbacks to enable a wide application: it has excellent colour and flavour preservation while not tasting unnaturally sweet or salty. It has a surprisingly high level of vegetable solids. Vegetable solids are defined as the solids of the dried vegetable product minus the amount of water, sucrose, film forming compound and edible salt. Surprisingly the products from this process also show a good retention of vitamins C.

In most cases dried vegetable product will be substantially free from added sucrose to avoid unnatural sweet tasting products. Substantially free from added sucrose means that only a minor amount added sucrose is present in the dried vegetable product e.g. at most 10 wt %, preferably at most 5 wt % or most desirably 0 wt % sucrose is present Optionally, 0 to 10 wt % or 0 to 5 wt % sucrose is present in the dried vegetable product. (all weights by weight of the dried vegetable product) The amount of "added sucrose" is defined as the additional amount of sucrose present in a dried vegetable product compared to a blanched reference. A blanched reference is the same vegetable blanched in water only for the same period at the same temperature and drying it in the same way as the dried vegetable product it is compared to.

The dried vegetable product will often be substantially free from monosodium glutamate. Substantially free from monosodium glutamate means that only a minor amount monosodium glutamate is present in the dried vegetable product e.g. at most 10 wt %, preferably at most 5 wt % or most desirably 0 wt % monosodium glutamate is present. Optionally 0 to 10 wt % or 0 to 5 wt % of monosodium glutamate is present in dried vegetable product. (all weights by weight of the dried vegetable product)

Thus, according to a further embodiment, a dried vegetable product is provided comprising from 50 to 95 wt %, preferably from 55 to 92 wt %, more preferably from 60 to 90 wt % of vegetable solids;

Aw from 0.1 to 0.45, preferably from 0.15 to 0.40, more preferably from 0.2 to 0.35;

from 0.5 to 30 wt %, preferably from 2 to 27 wt %, more preferably from 4 to 25 wt % of NaCl;

from 0.1 to 25 wt %, preferably from 0.5 to 20 wt %, more preferably from 2 to 15 wt % of at least one film forming compound;

The dried vegetable product is preferably substantially free from polyols selected from glycerol and sorbitol, preferably at least 0.01 wt %, more preferably at 0.05 wt %, most preferably at least 0.1 wt % and preferably at most 1 wt %, more preferably at most 0.1 wt %, most preferably 0 wt % of polyol;

The dried vegetable product is preferably comprises from 0.2 to 20 wt %, preferably from 0.5 to 10 wt %, more preferably from 1.5 to 5 wt % of atomic K;

from 0.05 to 7 wt %, preferably from 0.1 to 4 wt %, more preferably from 0.25 to 2 wt % of atomic Mg; and optionally from 0.1 to 10 wt %, preferably from 0.2 to 7 wt %, more preferably from 1.0 to 3 wt % of atomic Ca; all wt % by weight of the total dried vegetable product.

Said dried vegetable product is obtainable by a process as described above. It is preferably a dried coated vegetable product, preferably hypertonically heat-shocked. Preferably no solvents are used in the process for preparing the dried vegetable product. Antioxidants like vitamin C may also be added to the coating mix to reduce the browning effect or off-taste development due to oxidation for example in the case of carrots paprika celery roots, white cabbage, cauliflower and tomato. The dried vegetable product is preferably heat-treated like the hypertonic heat shock to deactivate enzymes present in the vegetable to increase the shelf life.

The dried vegetable product may be used advantageously in instant food products. Instant food products are typically packaged food products to which the consumer only needs add hot water or cook with some water to prepare e.g. a soup, meal, side dish or sauce. Instant food products have the advantage of long shelf stability at ambient temperature. An instant food product may comprise of from 0.01 to 15 wt %, preferably from 0.05 to 13 wt %, more preferably 0.1 to 10 wt % of water. Preferably, an instant food product will have a water activity (Aw) from 0.1 to 0.7, more preferably from 0.15 to 0.6, even more preferably from 0.2 to 0.5. In contrast to dried vegetables according to prior art processes, the dried vegetable product according to the invention does not introduce undesirable amounts of water into the instant food product. Extra water would cause the instant product which is usually at least partly in powder form to stick together and decrease the shelf stability and flowability. Thus, according to a further preferred embodiment of the invention an instant food product is provided selected from soup, meal, side dish, sauce and mixtures thereof comprising a dried vegetable product according to the invention.

The invention is more fully illustrated by the following non-limiting examples showing some preferred embodiments of the invention.

Example A

Fresh broccoli was washed and florets were cut whereby the largest dimension along one axis was about 15-20 mm. Example A was prepared by submerging 300 g of broccoli florets in 3 L of hypertonic heat shock solution at 103 degrees C. for 60 sec. The hypertonic heat shock solution comprised of 750 g NaCl dissolved in 3 L water. (20 wt % NaCl) The hypertonically heat shocked broccoli florets were drained but not rinsed before being added to the coating mix. The w/w ratio of coating mix to vegetable was 7.5 to 1. The 11% coating mix composition comprised of 6.75 wt % of maltodextrin DE 20 (from wheat), 2.25 wt % of NaCl, and 0.72 wt % of native potato starch. The coating mix was heated to gelatinize the starch and cooled to 55 degrees C. The pH of the coating mix was 6.8. The coating step was carried out at 55 degrees C. for 10 with occasionally stirring. The coated vegetables were then removed from the coating mix and dried in a conventional air drier at 70 degrees C. for 180 min.

Example B

Similar to example A except for the coating mix. Coating mix is the same as example except that instead of 2.25 wt % NaCl it contained 2.25 wt % of low sodium salt Synevo ex. Naturis. The pH of coating mix was 7.2. Mineral salt from Naturis is a blended low sodium salt comprising of about 40 wt % NaCl, 40 wt % KCl and about 17 wt % of Mg-salts (mainly as Epsomite crystals).

Comparative Example I

Comparative example I was prepared using broccoli florets as prepared for example A. The broccoli florets were heated for 3 min at 90-95° C. in water. After draining the florets were dried as in Example A. No coating was performed.

Comparative Example II

Comparative example II was prepared according to K. S. Jayaraman et al. (International Journal of Food Science and Technology (1990) 25, 47-60): after blanching the broccoli florets were drained and infused by immersion in a 3% salt and 6% sucrose in soaking solution, 6-8° C. for 15 hours and then dried.

TABLE 1

| (wt %) | A | B | Comp I | Comp II |
|---|---|---|---|---|
| NaCl | 19.0 | 18 | <0.1 | 19.7 |
| Film forming compound (wt %) | 14.3 | 15.4 | <0.5 | <0.5 |
| Sucrose | 1.0 | 1.0 | 2.0 | 33.2 |
| Water | 2.3 | 2.0 | 3 | 4.3 |
| vegetable solids | 63.4 | 63.6 | 95 | 42 |
| Aw | 0.22 | 0.23 | 0.26 | 0.34 |

TABLE 2

| | Micronutrients | | | |
|---|---|---|---|---|
| Content (wt %) | A | B | Comp I | Comp II |
| K+ | 0.7 | 2.6 | 0.3 | <0.05 |
| Mg++ | 0.14 | 0.32 | <0.1 | <0.05 |
| Ca++ | 0.35 | 0.37 | <0.1 | <0.05 |

Examples C and D

For examples C and D, broccoli florets were prepared on a small pilot scale according to example A except that the hypertonic heat shock solution comprised 13 wt % of NaCl.

For example C hand cut broccoli florets (size 15-20 mm) were used whereas in example D industrial cut florets of same raw material with similar dimension was used.

Example E

Fresh cauliflower florets were prepared on small pilot scale according to example C and D except that the coating mix further contained 0.1 wt % of citric acid to decrease the pH.

| (wt %) | C | D | E |
|---|---|---|---|
| NaCl | 15 | 15 | 14 |
| Film forming compound (wt %) | 10.4 | 9.8 | 13 |
| Sucrose | 0.8 | 0.8 | 0.8 |
| Water | 4.8 | 6.3 | 5.0 |
| vegetable solids | 69 | 68.1 | 67.2 |
| Aw | 0.33 | 0.38 | 0.34 |

Dried vegetables according to the invention had an excellent bite compared to Comparative Examples I and II. Dried vegetables according to the invention comprised more vegetable solids, did not contain added polyols, displayed better re-hydration behaviour, were not chewy but had a good bite and taste fresher. Vegetables prepared according Comparative example II were unnaturally sweet which limits the application.

Example E

Vegetables were prepared according to the invention (example A) with the difference that prior to the drying step the vegetables were frozen to −40 degrees C. The dried vegetables prepared with an intermediate freezing step were excellent in quality and comparable to dried hypertonically shocked vegetables prepared without the intermediate freezing step.

Vitamin C Retention

Vitamin C retention of vegetable prepared according to K. S. Jayaraman et al. (International Journal of Food Science and Technology (1990) 25, 47-60) was compared to vegetable prepared according to the invention. Example F was prepared as described above for Comparative Example II. Examples G and H were prepared according to Examples A and B respectively. The results show that broccoli florets prepared according to the invention showed much higher vitamin C retention than those prepared according Jayaraman et al.

| Vitamin C (based on dry solids) | |
|---|---|
| Fresh broccoli | 100% |
| Example F | 10% |
| Example G | 71% |
| Example H | 62% |

The invention claimed is:

1. A process for preparing a dried vegetable product comprising:
   a) optionally, washing and peeling of a vegetable;
   b) optionally, comminuting a vegetable;
   c) subjecting a vegetable to a hypertonic heat shock by contacting the vegetable with a hypertonic heat shock solution comprising about 5 wt % to about 35 wt % of at least one edible salt, said hypertonic heat shock solution having an osmolality of from 1250 to 10,000 mOsmol/kg;
      at a temperature of 101 to 112 degrees C.,
      for about 3 seconds to about 225 seconds;
   d) coating the hypertonicaliy heat shocked vegetable with an aqueous coating mix;
      wherein said coating mix comprises:
         i) about 0.03 to about 33 wt % at least one film forming compound selected from the group consisting of starch, dextrin, trehalose, soluble fibers, gums, agar agar, gelatine and mixtures thereof in an amount sufficient to form a film after drying the vegetable; and
         ii) from 0.1 to 25 wt % of an edible chloride salt composition selected from the group consisting of NaCl, KCl, $MgCl_2$, $CaCl_2$ and mixtures thereof;
      all wt % by weight of the total coating mix; and
   e) drying the coated hypertonically heat shocked vegetable to an Aw of from 0.1 to 0.45; and
   wherein said process to prepare said dried vegetable product is substantially free from polyols selected from the group consisting of glycerol, sorbitol, and mixtures thereof.

2. A process according claim 1 whereby the coating mix comprises
   a) from 0.5 to 25 wt % of a maltodextrin, and
   b) from 0.05 to 8 wt % of a starch,
   all wt % by weight of the total coating mix.

3. A process according to claim 2 wherein the starch is a native cold swelling starch.

4. A process according to claim 1 whereby for the coating step the hyper tonic heat shocked vegetable is contacted with the coating mix for 1 to 30 minutes and the coating mix has a temperature of from 20 to 80 degrees C.

5. A process according to claim 1 whereby the coated hypertonically heat shocked vegetable is dried until an Aw is achieved of from 0.1 to 0.45.

6. A process according to claim 1 whereby the vegetable is selected from broccoli, green beans, garden pea, green asparagus, spinach, zucchini, green onion, rucola, water crest, pak choy, green cabbage, lettuce, wine leaves, green bell pepper, green chili pepper and mixtures thereof and whereby the coating mix has a pH of 6.5 to 8.

7. A process according to claim 1 whereby prior to the drying step the coated hypertonically heat shocked vegetable is frozen.

8. An instant food product selected from soup, meal, side dish, sauce and mixtures thereof comprising a dried vegetable product made by the process of claim 1.

9. A process according to claim 1 wherein the vegetable is submerged during hypertonic heat shock.

* * * * *